May 18, 1926.
J. B. LOWELL ET AL
1,585,160
GAME APPARATUS
Filed Oct. 31, 1922
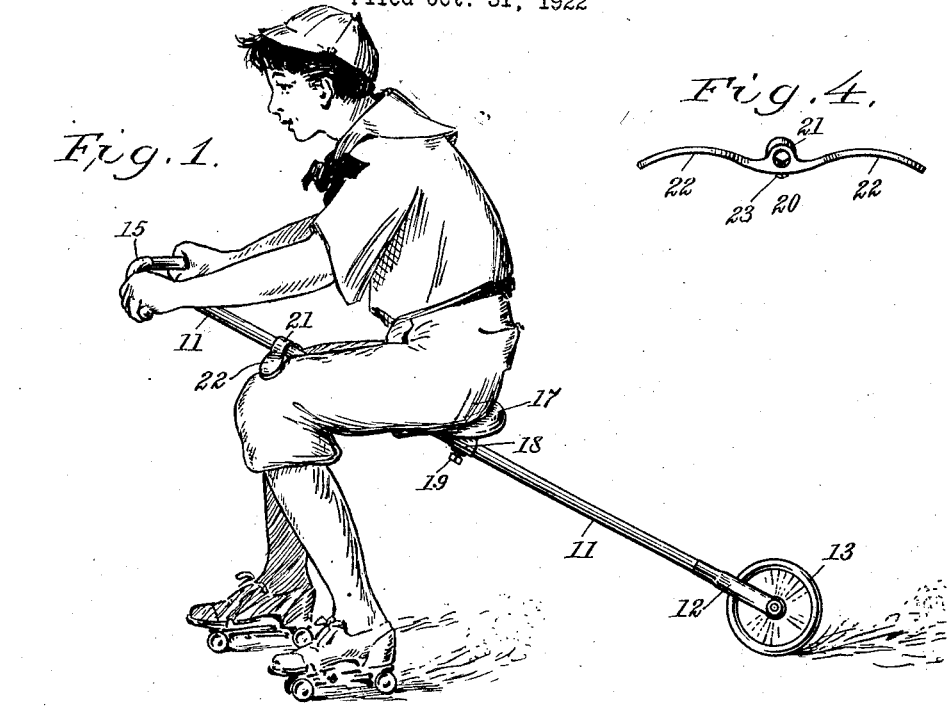
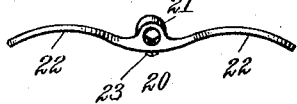
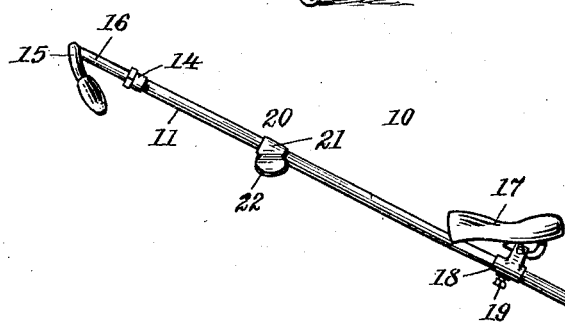
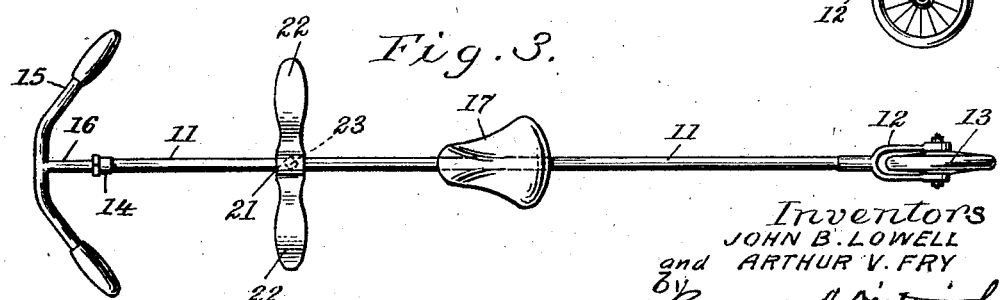
Inventors
JOHN B. LOWELL
and ARTHUR V. FRY
by Conrad A. Dietrich
their Atty Patented May 18, 1926.

1,585,160

UNITED STATES PATENT OFFICE.

JOHN B. LOWELL, OF BRISTOL, CONNECTICUT, AND ARTHUR V. FRY, OF RIDGEWOOD, NEW JERSEY.

GAME APPARATUS.

Application filed October 31, 1922. Serial No. 598,083.

Our invention relates to improvements in toy apparatus, and the same has for its object more particularly to provide a simple, convenient and inexpensive apparatus adapted to be used by the operator when mounted upon a pair of roller skates.

Further, said invention has for its object to provide an apparatus adapted to support the operator in sitting position, and which will, when the operator is mounted upon roller skates or the like, serve in combination with said roller skates or the like to form a convenient vehicle.

Further, said invention has for its object to provide an apparatus comprising a shaft having a revoluble member at one end and means adapted to engage with the limbs of the operator whereby to maintain said apparatus in position to serve as a support for the operator.

Other objects will, in part, be obvious and, in part, be pointed out hereinafter.

To the attainment of the aforesaid objects and ends, our invention consists in the novel details of construction, and in the combination, connection and arrangement of parts hereinafter more fully described, and then pointed out in the claims.

In the accompanying drawings forming part of this specification—

Figure 1 is an illustrative view showing one form of device constructed according to and embodying our said invention, and the manner of using the same;

Fig. 2 is a side elevation of said device;

Fig. 3 is a top view, and

Fig. 4 is a detail side view of the leg-engaging member.

In said drawings 10 designates the device as a whole consisting of a shaft 11 which may be made of wood or other suitable material, but preferably of metal tubing, having a forked member 12 at its lower end in which is mounted a wheel 13 or other suitable shoe or member. The upper end of said tube is exteriorly threaded to receive a clamping nut 14.

15 denotes a handle-bar having a stem 16 adjustably disposed within the upper end of the shaft 11, and adapted to be secured to its adjusted position by the clamping nut 14.

About midway of the ends of the shaft 11 is arranged a saddle 17 which is fixed upon a slidable support 18 mounted upon the shaft 11, and provided with a screw 19 for securing said saddle and support to adjusted position upon said shaft.

20 denotes a leg-engaging member which is mounted upon the shaft 11 intermediate the saddle 17 and the handle-bar 15. The said leg-engaging member may be made of any suitable material, but preferably of metal and comprises a tubular hub or sleeve 21 from the opposite sides of which are arranged laterally-extending arms 22 which are slightly curved in order to conform more readily to the contour of the thighs or legs of the operator. The arms 22 are disposed at an angle to the longitudinal axis of the hub or sleeve 21 in order that the undersides or bearing surfaces of said arms shall be in a substantially horizontal plane when the device is in use.

The leg-engaging member 20, as a whole, is adjustably mounted upon the shaft 11, and may be secured to any desired position by a screw 23 extending through the hub or sleeve 21 and engaging the shaft 11.

The operation of the device will be obvious. It need merely to be noted that the same is particularly adapted for use in enabling the operator, when mounted upon roller skates, ice skates, skis or analogous devices, to coast down inclined surfaces, or to travel short distances upon relatively smooth, level surfaces.

While we have shown and described but one embodiment of our said invention, it will be obvious that various modifications may be made within the scope of the claims.

Having thus described our said invention what we claim and desire to secure by Letters Patent is:

1. A device of the character described comprising a shaft, a support for the operator thereon, a ground engaging member at one end of said shaft, a handle at the other end of said shaft, and leg engaging members projecting from said shaft intermediate said support and said handle; said members being transversely curved to conform to the contour of the legs and having extended bearing surfaces arranged at an angle to the longitudinal axis of said shaft, whereby said surfaces longitudinally will be disposed horizontally when the device is in use, substantially as specified.

2. A device of the character described, comprising a shaft, a support for the operator thereon a ground engaging member at one end of said shaft, a handle at the other end of said shaft, a tubular hub secured on said shaft intermediate said support and said handle, and leg engaging members projecting from said hub; said members being transversely curved to conform to the contour of the legs and having extended bearing surfaces arranged at an angle to the longitudinal axis of said hub, whereby said surfaces longitudinally will be disposed horizontally when the device is in use, substantially as specified.

3. A device of the character described comprising a shaft, a ground engaging member at the lower end of said shaft, a seat carried by said shaft and longitudinally adjustable thereon, a handle bar at the opposite end of said shaft and longitudinally adjustable thereon, a tubular member adjustably secured to said shaft intermediate said seat and said handle bar, and leg engaging members projecting from said tubular member; said leg engaging members being transversely curved to conform to the contour of the legs and having extended bearing surfaces arranged at an angle to the longitudinal axis of said shaft, whereby said surfaces longitudinally will be disposed horizontally when the device is in use, substantially as specified.

Signed at the city of New York, in the county and State of New York, this 17th day of October, one thousand nine hundred and twenty-two.

JOHN B. LOWELL.
ARTHUR V. FRY.